US012663319B2

(12) United States Patent
Handanhal Ramachandra et al.

(10) Patent No.: US 12,663,319 B2
(45) Date of Patent: Jun. 23, 2026

(54) LOCAL SILICON-PHOTONICS TEMPERATURE SENSOR

(71) Applicant: Cisco Technology, Inc., San Jose, CA (US)

(72) Inventors: Sujit Handanhal Ramachandra, Allentown, PA (US); Abhishek Bhat, Allentown, PA (US); Prajwal M. Kasturi, Breinigsville, PA (US)

(73) Assignee: Cisco Technology, Inc., San Jose, CA (US)

( * ) Notice: Subject to any disclaimer, the term of this patent is extended or adjusted under 35 U.S.C. 154(b) by 374 days.

(21) Appl. No.: 18/341,543

(22) Filed: Jun. 26, 2023

(65) Prior Publication Data

US 2024/0426676 A1     Dec. 26, 2024

(51) Int. Cl.
| | |
|---|---|
| *G01K 7/18* | (2006.01) |
| *G02F 1/01* | (2006.01) |
| *H04B 10/40* | (2013.01) |

(52) U.S. Cl.
CPC ........... *G01K 7/183* (2013.01); *G02F 1/0147* (2013.01); *H04B 10/40* (2013.01)

(58) Field of Classification Search
CPC .... G01K 7/183; G01K 15/005; G02F 1/0147; H04B 10/40
See application file for complete search history.

(56) References Cited

U.S. PATENT DOCUMENTS

| | | | |
|---|---|---|---|
| 5,095,227 A | 3/1992 | Jeong | |
| 10,527,784 B1 | 1/2020 | Koste et al. | |
| 11,356,107 B1 | 6/2022 | Bhat et al. | |
| 2004/0264834 A1 | 12/2004 | McIntyre et al. | |
| 2009/0314763 A1 | 12/2009 | Chu et al. | |
| 2020/0059106 A1* | 2/2020 | Karlsson | H01M 10/482 |
| 2020/0182707 A1 | 6/2020 | Badets et al. | |
| 2022/0107229 A1 | 4/2022 | Barnard et al. | |
| 2024/0288717 A1* | 8/2024 | Huang | G02F 1/225 |
| 2024/0395567 A1* | 11/2024 | Croissant | H01L 23/49816 |

OTHER PUBLICATIONS

Hyun Tae Kim and Miao Yu, "Cascaded ring resonator based temperature sensor with simultaneously enhanced sensitivity and range," Opt. Express 24, 9501 9510 (2016) pp. 1-10.

Radhouene , M., Chhipa , M.K., Najjar, M. et al. Novel design of ring resonator based temperature sensor using photonics technology. Photonic Sens 7, 311 316 (2017). pp. 1-6 <https://doi.org/10.1007/s13320> 017 0443 z.

A. Mai, S. Bondarenko , C. Mai and P. Steglich , "Photonic thermal sensor integration towards electronic photonic IC technologies," ESSDERC 2019 49th European Solid State Device Research Conference (ESSDERC), 2019, pp. 254 257. [Abstract Only].

* cited by examiner

*Primary Examiner* — John E Breene
*Assistant Examiner* — Manuel Salvador Castellon, Jr.
(74) *Attorney, Agent, or Firm* — Patterson + Sheridan, LLP

(57)     ABSTRACT

The present disclosure describes systems and methods for detecting temperature in an electro-optical circuit (e.g., an electro-optical transceiver). According to an embodiment, an electro-optical circuit includes a photonic integrated circuit and an electronic integrated circuit. The photonic integrated circuit includes an optical component and a first resistor positioned by the optical component. The electronic integrated circuit determines a temperature for the optical component based on a first resistance of the first resistor.

20 Claims, 5 Drawing Sheets

100

Electronic Integrated Circuit

Temperature Circuit

110

104

108

108

Optical Component

102

Optical Component

106

106

Photonic Integrated Circuit

LOCAL SILICON-PHOTONICS TEMPERATURE SENSOR

TECHNICAL FIELD

Embodiments presented in this disclosure generally relate to electro-optical circuits. More specifically, embodiments disclosed herein relate to a temperature sensor for electro-optical circuits.

BACKGROUND

Electro-optical circuits may include electrical circuits and optical circuits. The optical circuits may be thermally tuned and sensitive to local temperature, and it may be important to monitor the temperature of the optical circuits and their components.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 1:
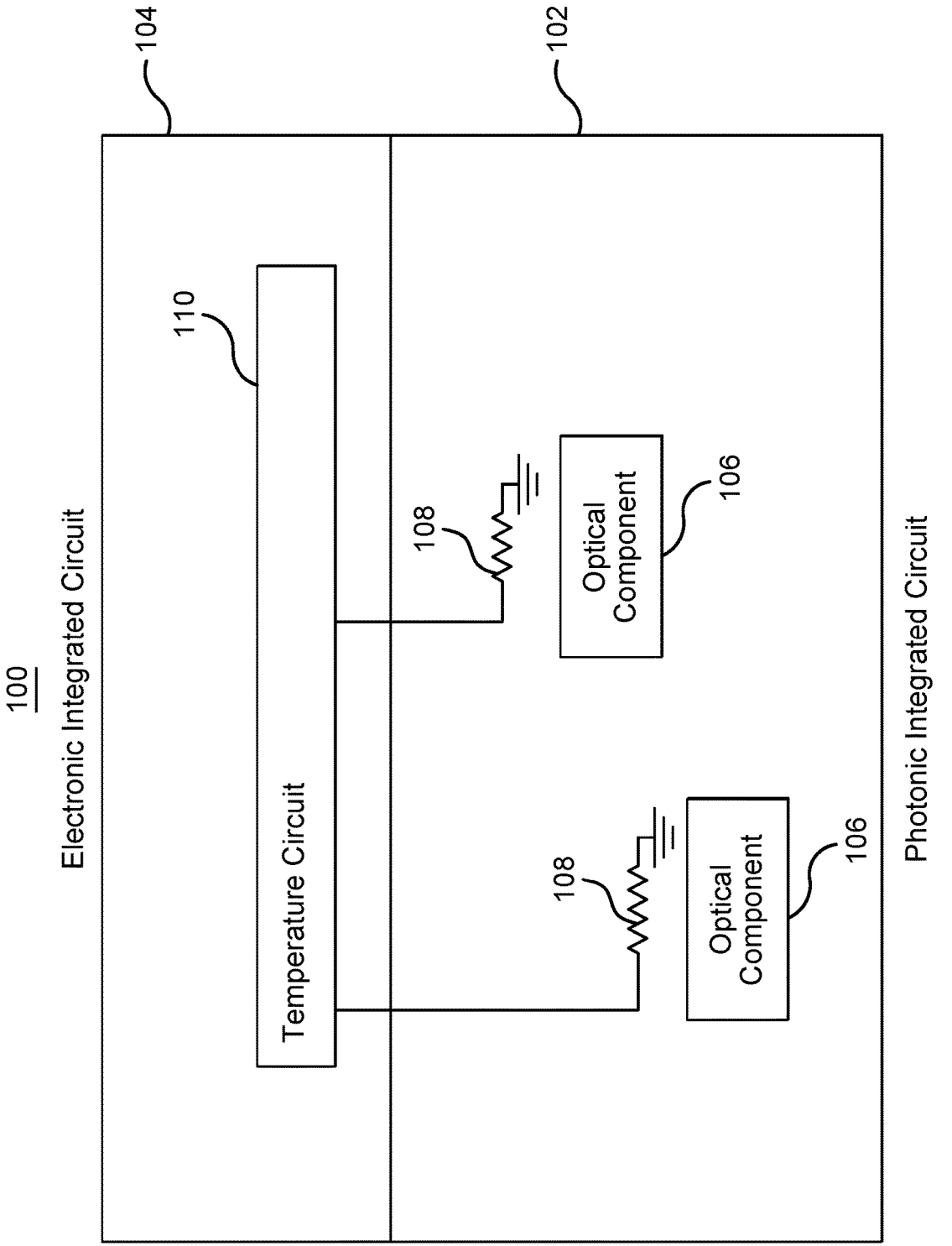
FIG. 1 illustrates an example system.

The present disclosure describes systems and methods for detecting temperature in an electro-optical circuit (e.g., an electro-optical transceiver). According to an embodiment, an electro-optical circuit includes a photonic integrated circuit and an electronic integrated circuit. The photonic integrated circuit includes an optical component and a first resistor positioned by the optical component. The electronic integrated circuit determines a temperature for the optical component based on a first resistance of the first resistor.

According to another embodiment, a method includes determining, by an electronic integrated circuit, a first resistance of a first resistor positioned in a photonic integrated circuit and by an optical component of the photonic integrated circuit. The electronic integrated circuit is positioned on the photonic integrated circuit. The method also includes determining, by the electronic integrated circuit, a temperature for the optical component based on the first resistance.

According to another embodiment, a system includes a photonic integrated circuit and an electronic integrated circuit. The photonic integrated circuit includes an optical component and a first resistor positioned by the optical component. The electronic integrated circuit is positioned on the photonic integrated circuit. The electronic integrated circuit is arranged to determine a temperature for the optical component based on a first resistance of the first resistor.

EXAMPLE EMBODIMENTS

It may be important to monitor the temperature of thermally-tuned optical circuits and their components. As optical circuits grow in size, the optical circuits may have different local temperatures based on the components in that local region of the optical circuit. Existing optical circuits may include external temperature sensors that sense a global temperature for the optical circuit. The detected global temperature, however, may be different from the local temperatures in the different regions of the optical circuit. Thus, calibration according to the detected global temperature may be bulky, complex, and/or ineffective.

The present disclosure describes a system that uses a resistor positioned within a photonic integrated circuit to detect a local temperature within the photonic integrated circuit. An electronic integrated circuit positioned on the photonic integrated circuit may determine a local temperature around or near the resistor in the photonic integrated circuit based on a resistance of the resistor. For example, the resistance of the resistor may change depending on the local temperature in the photonic integrated circuit near the resistor. An oscillator in the electronic integrated circuit may produce an oscillating signal with a frequency that changes when the resistance of the resistor changes. The electronic integrated circuit may determine the local temperature near the resistor by monitoring the frequency changes in the oscillating signal.

In certain embodiments, the system provides several technical advantages. For example, the system may allow for local temperatures within a photonic integrated circuit to be detected. As another example, the system may improve the accuracy of the detected local temperatures within the photonic integrated circuit.

FIG. 1 illustrates an example system 100, which may be an electro-optical circuit. As seen in FIG. 1, the system 100 includes a photonic integrated circuit 102 and an electronic integrated circuit 104 positioned on the photonic integrated circuit 102.

The photonic integrated circuit 102 includes one or more optical components 106 and one or more resistors 108. Generally, an optical component 106 may convert an optical signal into an electrical signal, or vice versa. The photonic integrated circuit 102 may then communicate the electrical signal to the electronic integrated circuit 104. The photonic integrated circuit 102 or the optical components 106 may be thermally tuned, and their operation may be affected by their temperatures. Thus, it may be important to monitor the local temperatures of the optical components 106.

The resistors 108 may be used to determine the local temperatures of the optical components 106. The resistors 108 may be formed using any material or components. For example, the resistors 108 may include doped silicon (e.g., p-doped or n-doped silicon material). As seen in FIG. 1, each resistor 108 is positioned by an optical component 106. As an optical component 106 operates, the optical component 106 may produce heat, which increases the local temperature around the optical component 106. The increase in the local temperature may be experienced by the resistor positioned by or near the optical component 106. Similarly, when the electronic circuits in the electronic integrated circuit 104 positioned above the photonic integrated circuit 102 operate, the electronic circuits can produce heat and increase the local temperature around the optical component 106. This change in temperature may be experienced by the resistor 108 positioned by or near the optical component 106.

The resistance of each resistor 108 may vary depending on the local temperature. For example, if the local temperature increases and a resistor 108 heats up, its resistance may increase. If the resistor 108 cools off, its resistance may decrease. Thus, the local temperature may be determined by observing the resistance of the resistor 108. As a result, it is possible to monitor the local temperature near or around the optical component 106 by monitoring the resistance of the resistor 108.

The electronic integrated circuit 104 processes or handles electrical signals from the photonic integrated circuit 102. Additionally, the electronic integrated circuit 104 determines the local temperatures around the resistors 108 in the photonic integrated circuit 102. As seen in FIG. 1, the electronic integrated circuit 104 includes a temperature circuit 110. The resistors 108 in the photonic integrated circuit 102 may be electrically connected to the temperature circuit 110. Generally, the temperature circuit 110 includes oscillators that produce oscillating signals. The frequencies of the oscillating signals may change depending on changes to the resistances of the resistors 108 in the photonic integrated circuit 102. The temperature circuit 110 may monitor the changes in the frequencies of the oscillating signals and determine the local temperatures near or around the resistors 108 using the frequency changes.

The photonic integrated circuit 102 and the electronic integrated circuit 104 may be arranged in the same package. For example, the photonic integrated circuit 102 and the electronic integrated circuit 104 may be positioned on a common substrate. The photonic integrated circuit 102 may be positioned next to the electronic integrated circuit 104 on the substrate. An interposer may route the electrical connections between the photonic integrated circuit 102 and the electronic integrated circuit 104. In the example of FIG. 1, the electronic integrated circuit 104 is positioned on the photonic integrated circuit 102 in a stacked vertical arrangement. As another example, both the photonic integrated circuit 102 and the electronic integrated circuit 104 may be implemented in a single chip, which has complementary metal-oxide semiconductor (CMOS) processes with embedded silicon-photonics layers.

Figure 2:
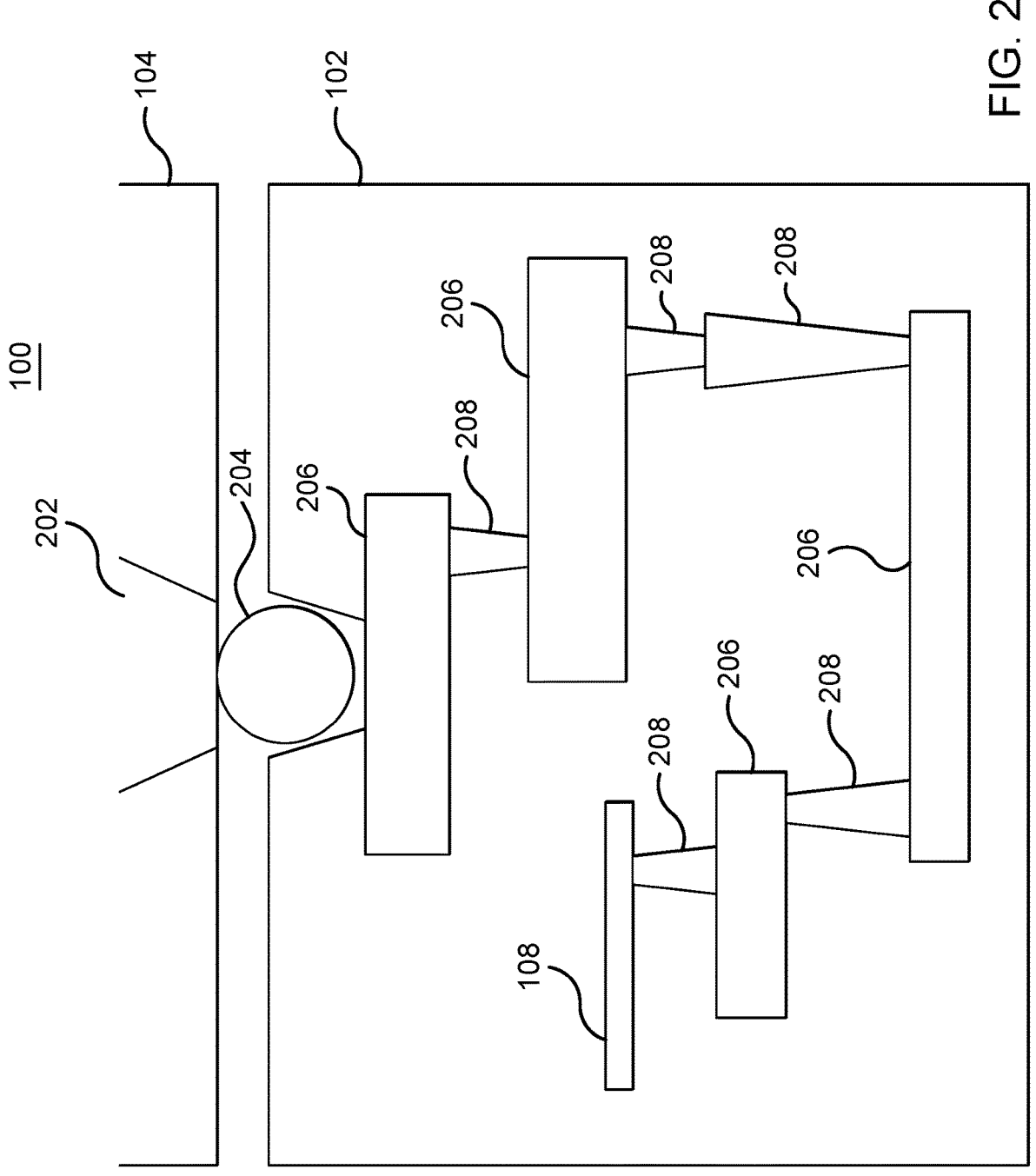
FIG. 2 illustrates a portion of the system of FIG. 1.

FIG. 2 illustrates a portion of the system 100 of FIG. 1. As seen in FIG. 2, the electronic integrated circuit 104 is positioned on the photonic integrated circuit 102. A via 202 in the electronic integrated circuit 104 is electrically connected to a solder bump 204. The solder bump 204 is electrically connected to the resistor 108 in the photonic integrated circuit 102 by a series of metal layers 206 and vias 208 in the photonic integrated circuit 102. The metal layers 206 may be electrically connected to each other by vias 208. Additionally, the resistor 108 may be electrically connected to a metal layer 206 by a via 208. In this manner, the electronic integrated circuit 104 (e.g., the temperature circuit 110 in the electronic integrated circuit 104) is electrically connected to the resistor 108 in the photonic integrated circuit 102.

Figure 3:
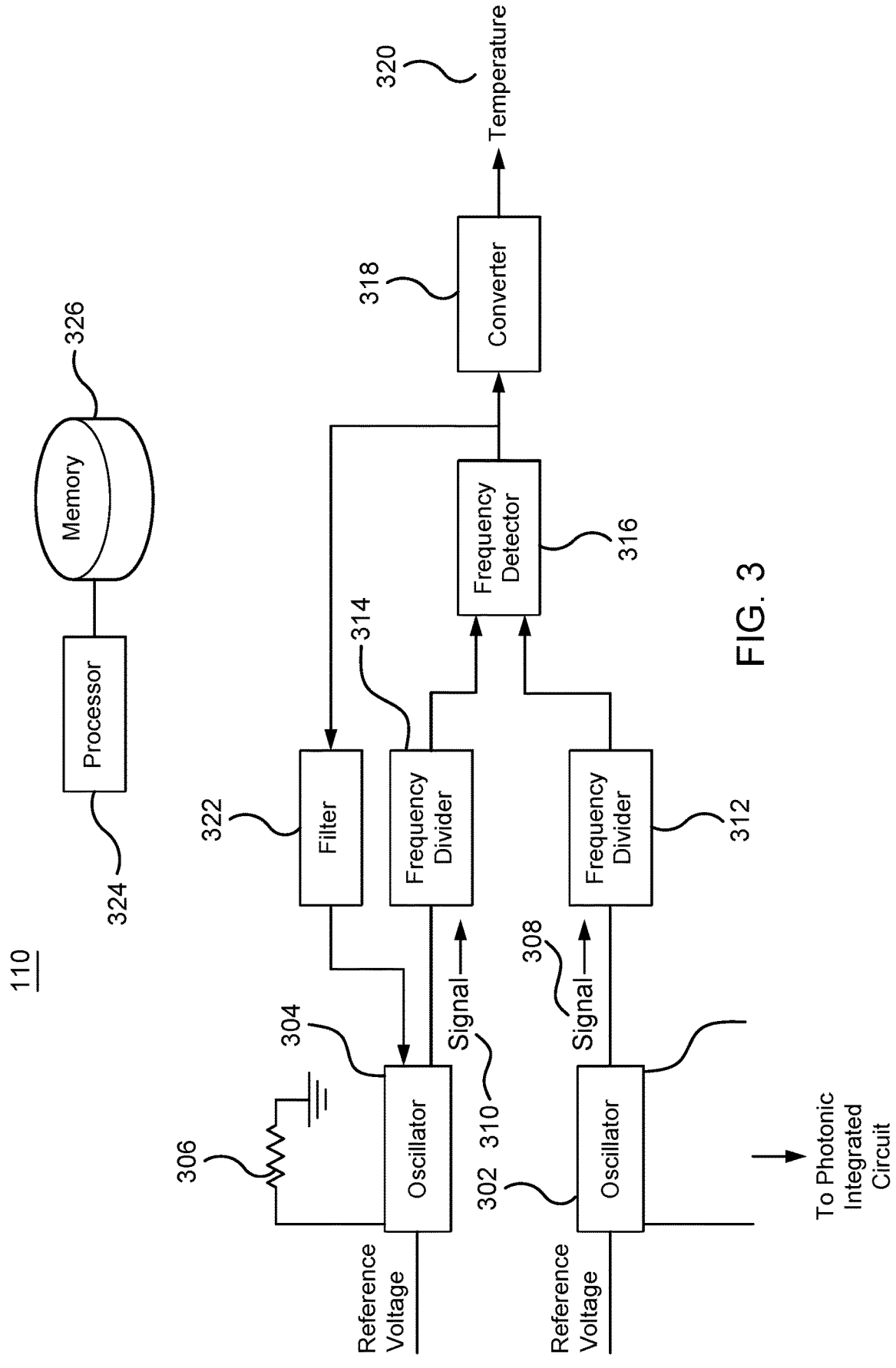
FIG. 3 illustrates an example temperature circuit of the system of FIG. 1.

FIG. 3 illustrates an example temperature circuit 110 of the system 100 of FIG. 1. As seen in FIG. 3, the temperature circuit 110 includes an oscillator 302, an oscillator 304, a resistor 306, a frequency divider 312, a frequency divider 314, a frequency detector 316, a converter 318, a filter 322, a processor 324, and a memory 326. The processor 324 and the memory 326 may perform the actions or functions of the temperature circuit 110 described herein. For example, the processor 324 and the memory 326 may store and execute software or firmware that implements the operation of the frequency detector 316, converter 318, and filter 322.

The oscillators 302 and 304 may be matched oscillators. For example, the oscillators 302 and 304 may produce the same outputs (e.g., oscillating signals with the same frequencies) if they are provided the same control inputs. Additionally, the oscillators 302 and 304 are positioned close to each other in the electronic integrated circuit 104 so that the oscillators 302 and 304 experience the same ambient conditions and disturbances. In some embodiments, the oscillators 302 and 304 are voltage controlled oscillators, and an input of each oscillator 302 and 304 is connected to the same reference voltage. A second input of the oscillator 302 is connected to a resistor 108 in the photonic integrated circuit 102. A second input of the oscillator 304 is connected to the resistor 306. The resistor 306 may have a variable resistance that can be adjusted or calibrated during a tuning operation. In some embodiments, the resistor 306 is formed using multiple resistors electrically connected to one another. For example, the resistor 306 may include a resistor external to the oscillator 304 and a variable resistor within the oscillator 304 and connected in parallel to the resistor external to the oscillator 304. The resistance of the resistor 306 may be adjusted by adjusting the resistance of the variable resistor. The resistor 306 may be an external resistor outside the electronic integrated circuit 104, placed in or on a printed circuit board that connects to a package containing the photonic integrated circuit 102 and the electronic integrated circuit 104 and to other components. The resistor 306 may be placed in a location in or on the printed circuit board that maintains a constant (or near constant) temperature.

The oscillator 302 produces an oscillating signal 308, and the oscillator 304 produces an oscillating signal 310. The frequencies of the oscillating signals 308 and 310 are controlled by the reference voltage input to the oscillators 302 and 304 and by the resistances at the second inputs of the oscillators 302 and 304. For example, the frequency of the signal 308 may be controlled by the reference voltage input to the oscillator 302 and by the resistance of the resistor 108 in the photonic integrated circuit 102. The frequency of the signal 310 may be controlled by the reference voltage input to the oscillator 304 and by the resistance of the resistor 306. Thus, if the oscillator 302 and the oscillator 304 receive the same reference voltage over their first inputs, any difference in the frequencies of the oscillating signal 308 and the oscillating signal 310 is attributable to the difference in resistances between the resistor 108 in the photonic integrated circuit 102 and the resistor 306. As a result, if the resistance of the resistor 108 in the photonic integrated circuit 102 changes (e.g., due to temperature changes), the temperature circuit 110 may determine that change in resistance by analyzing a change in the difference between the frequencies of the oscillating signals 308 and 310.

The frequency dividers 312 and 314 and the frequency detector 316 may analyze the oscillating signals 308 and 310 to determine the difference in their frequencies. The frequency dividers 312 and 314 may divide or reduce the frequencies of the oscillating signals 308 and 310. For example, the frequency divider 312 may divide or reduce the frequency of the oscillating signal 308 by a scaling factor, and the frequency divider 314 may divide or reduce the frequency of the oscillating signal 310 by the same scaling factor. The frequency detector 316 may then determine a difference between the frequency-divided oscillating signals. The frequency detector 316 may output this frequency difference. In some embodiments, the frequency detector 316 outputs a digital sequence indicating the frequency difference (e.g., with each bit increment representing an amount of increase in the difference).

The converter 318 converts the frequency difference between the scaled oscillating signals from the frequency detector 316 into a temperature 320. For example, the converter 318 may be programmed with or may be provided with a conversion rate for temperature and frequency difference. The converter 318 may multiply the frequency difference from the frequency detector 316 by the conversion rate to determine a temperature change. If the output of the frequency detector 316 is a digital sequence, the converter 318 may be programmed with or may be provided with a conversion rate for temperature per bit. The converter 318 may multiply the digital sequence by the conversion rate to determine the temperature change. The converter 318 may then apply the temperature change to a measured ambient temperature (e.g., by adding the temperature change to the ambient temperature) to determine the local temperature near or around the resistor 108 in the photonic integrated circuit 102.

The temperature circuit 110 may perform a tuning operation (e.g., at startup) to ensure that the oscillators 302 and 304 produce oscillating signals 308 and 310 with the same frequencies prior to operating the photonic integrated circuit 102 (e.g., when the optical components 106 in the photonic integrated circuit 102 are at ambient temperature). During the tuning operation, the oscillators 302 and 304 may produce the oscillating signals 308 and 310. The frequency detector 316 may detect a difference between the frequencies of the oscillating signals 308 and 310. The frequency detector 316 may communicate the difference to the filter 322. The filter 322 may adjust the resistance of the resistor 306 (or the resistance of a variable resistor component of the resistor 306), which adjusts the frequency of the oscillating signal 310. The adjustment may reduce the difference between the frequencies of the oscillating signals 308 and 310. The filter 322 may continue adjusting the resistance until the difference in frequencies falls below a threshold or the average frequency difference becomes zero. The temperature circuit 110 may then consider the oscillators 302 and 304 tuned and end the tuning operation. By performing the tuning operation, the temperature circuit 110 may ensure that any subsequently detected differences in the frequencies of the oscillating signals 308 and 310 is attributable solely to changes in resistance of the resistor 108 in the photonic integrated circuit 102 due to temperature changes. The filter 322 may be a digital filter that is implemented in firmware or using dedicated hardware. In some embodiments, the filter 322 is a digital accumulator that accumulates input digital data and produces output digital data.

The processor 324 is any electronic circuitry, including, but not limited to one or a combination of microprocessors, microcontrollers, application specific integrated circuits (ASIC), application specific instruction set processor (ASIP), and/or state machines, that communicatively couples to memory 326 and controls the operation of the temperature circuit 110. The processor 324 may be 8-bit, 16-bit, 32-bit, 64-bit or of any other suitable architecture. The processor 324 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The processor 324 may include other hardware that operates software to control and process information. The processor 324 executes software stored on the memory 326 to perform any of the functions described herein. The processor 324 controls the operation and administration of the temperature circuit 110 by processing information (e.g., information received from the resistors 108, resistor 306, and memory 326). The processor 324 is not limited to a single processing device and may encompass multiple processing devices.

The memory 326 may store, either permanently or temporarily, data, operational software, or other information for the processor 324. The memory 326 may include any one or a combination of volatile or non-volatile local or remote devices suitable for storing information. For example, the memory 326 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in the memory 326, a disk, a CD, or a flash drive. In particular embodiments, the software may include an application executable by the processor 324 to perform one or more of the functions described herein.

Figure 4:
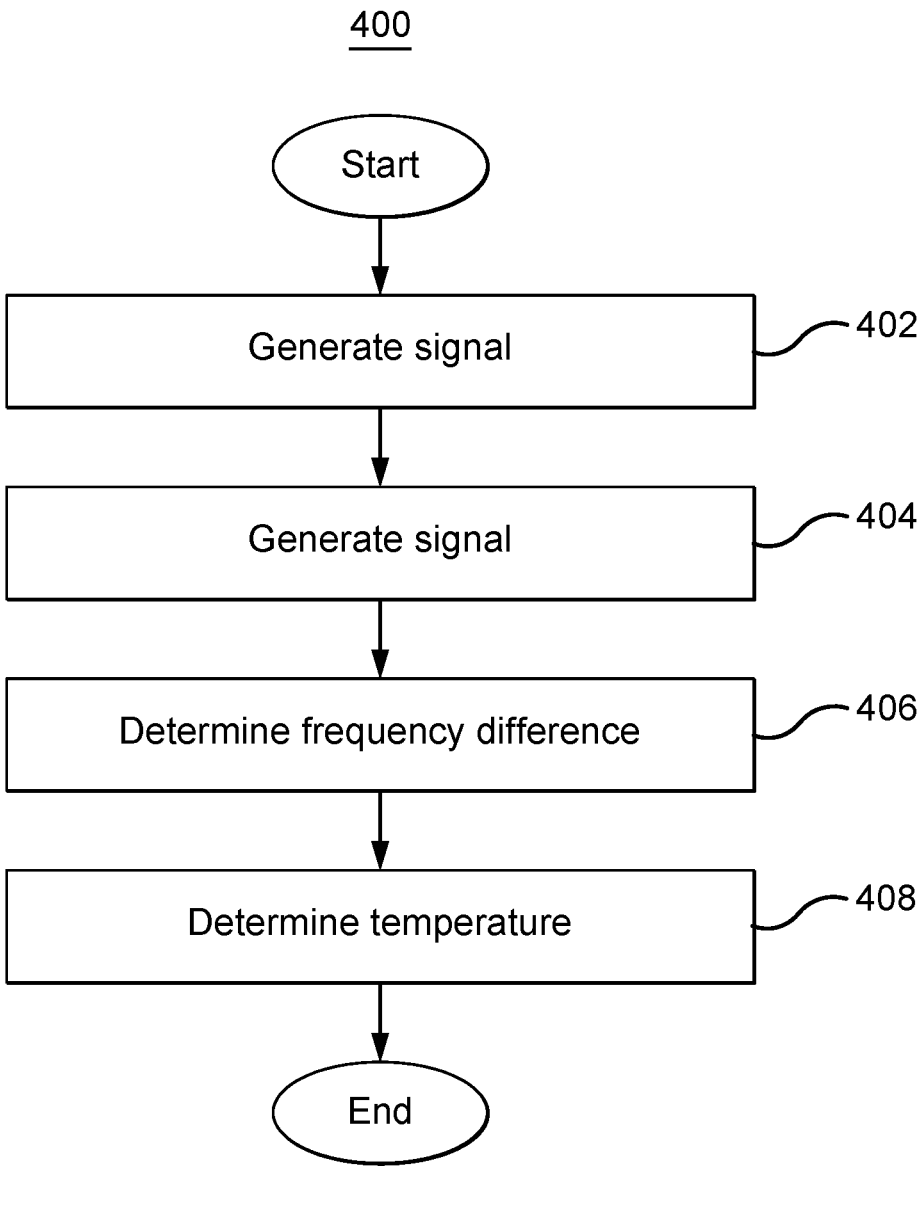
FIG. 4 is a flowchart of an example method performed in the system of FIG. 1.

FIG. 4 is a flowchart of an example method 400 performed in the system 100 of FIG. 1. In particular embodiments, the temperature circuit 110 performs the method 400. By performing the method 400, the temperature circuit 110 determines a local temperature near or around the resistor 108 or the optical component 106 in the photonic integrated circuit 102.

In block 402, the temperature circuit 110 generates a signal 308. The signal 308 may be an oscillating signal produced by the oscillator 302. In block 404, the temperature circuit 110 generates a signal 310. The signal 310 may be an oscillating signal produced by the oscillator 304. The oscillators 302 and 304 may be matched so that the oscillators 302 and 304 produce oscillating signals with the same frequencies if the oscillators 302 and 304 are provided the same inputs. Additionally, the oscillators 302 and 304 are positioned near each other in the electronic integrated circuit 104 so that the oscillators 302 and 304 experience the same ambient conditions and disturbances.

As discussed previously, an input of the oscillator 302 may be electrically connected to the resistor 108 in the photonic integrated circuit 102. As the resistance of the resistor 108 changes (e.g., due to local temperature changes in the photonic integrated circuit 102), the frequency of the oscillating signal 308 produced by the oscillator 302 changes. By keeping other inputs to the oscillators 302 and 304 the same, any difference in the frequencies of the oscillating signals 308 and 310 may be attributable solely to the changes in resistance of the resistor 108.

In block 406, the temperature circuit 110 determines a frequency difference between the oscillating signals 308 and 310. The temperature circuit 110 may divide or reduce the frequencies of the oscillating signals 308 and 310 before determining a difference in the frequencies of the frequency-divided signals.

In block 408, the temperature circuit 110 determines a temperature using the determined frequency difference. For example, the temperature circuit 110 may be programmed with or may be provided with a conversion rate that converts between temperature and frequency difference. The temperature circuit 110 may multiply the determined frequency difference with the conversion rate to determine a temperature change. The temperature circuit 110 may then add the temperature change to a measured ambient temperature to determine a local temperature near or around the resistor 108 or the optical component 106 in the photonic integrated circuit 102.

In some embodiments, the temperature circuit 110 provides the determined frequency difference as a digital sequence (e.g., with each bit increment indicating a particular amount of frequency increase). The temperature circuit 110 may be programmed with or may be provided with a conversion rate for temperature per bit. The temperature circuit 110 may multiply the digital sequence by the conversion rate to determine the temperature change. The temperature circuit 110 may then apply the temperature change to a measured ambient temperature (e.g., by adding the temperature change to the ambient temperature) to determine the temperature of the resistor 108 or the optical component 106. In certain embodiments, the conversion from frequency difference to temperature may be based on a stored lookup table. The table may map frequency differences to corresponding temperatures. The lookup table may be stored in the memory 326 and may be referenced by the processor 324 to convert frequency differences to temperature.

Figure 5:
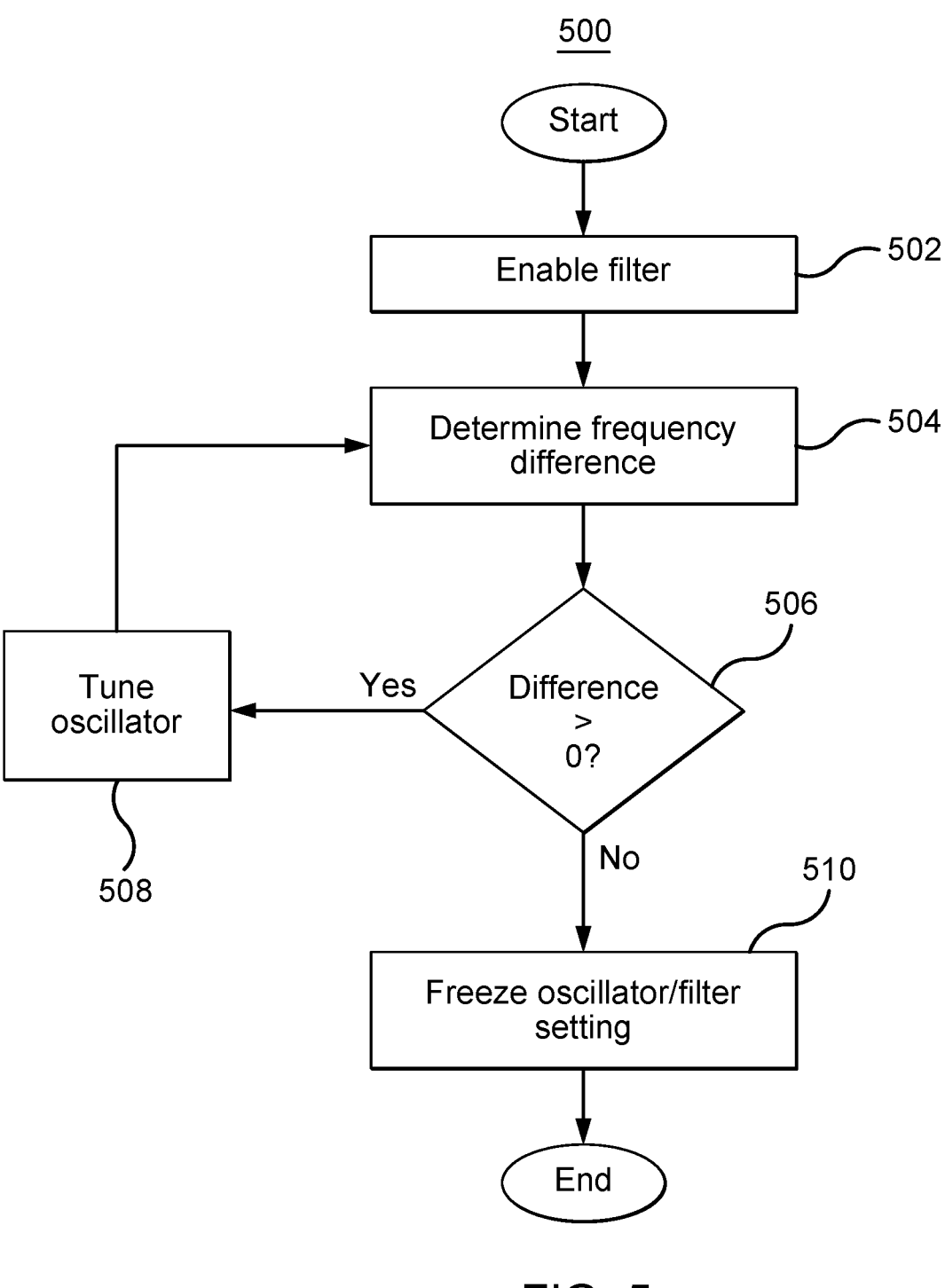
FIG. 5 is a flowchart of an example method performed in the system of FIG. 1.

FIG. 5 is a flowchart of an example method 500 performed in the system 100 of FIG. 1. In particular embodiments, the temperature circuit 110 performs the method 500. By performing the method 500, the temperature circuit 110 performs a tuning operation that calibrates the oscillator 304 of the temperature circuit 110. The temperature circuit 110 may perform the method 500 during startup when the photonic integrated circuit 102 has not been operating and the optical component 106 of the photonic integrated circuit 102 is at ambient temperature. By performing the tuning operation, the temperature circuit 110 may ensure that the oscillator 302 and the oscillator 304 produce oscillating signals 308 and 310 with the same frequencies when the optical component 106 of the photonic integrated circuit 102 is at ambient temperature.

In block 502, the temperature circuit 110 enables the filter 322. The temperature circuit 110 may activate an enable signal to the filter 322 to enable the filter 322. When the filter 322 is disabled, the filter 322 may not respond to detected frequency differences in the oscillating signals 308 and 310 produced by the oscillators 302 and 304. When the filter 322 is enabled, the filter 322 may respond by adjusting the resistor 306 (or a variable resistor component of the resistor 306) to reduce the frequency difference.

In block 504, the temperature circuit 110 determines a difference between the frequencies of the oscillating signals 308 and 310. For example, the temperature circuit 110 may divide or reduce the frequencies of the oscillating signals 308 and 310 (e.g., using the frequency dividers 312 and 314) and then determine a difference in the frequencies of the frequency-divided signals (e.g., using the frequency detector 316).

In block 506, the temperature circuit 110 may determine whether a magnitude of the difference is larger than zero. In some embodiments, the temperature circuit 110 may determine whether the magnitude of the difference is larger than a threshold value. If the magnitude of the difference is larger than zero (or another threshold), the temperature circuit 110 tunes the oscillator 304 in block 508. In some embodiments, the temperature circuit 110 tunes the oscillator 304 by adjusting (e.g., using the filter 322) the resistance of the resistor 306 or a variable resistor component of the resistor

306. Adjusting this resistance changes the frequency of the oscillating signal 310 produced by the oscillator 304. The temperature circuit 110 may then determine the frequency difference between the oscillating signals 308 and 310 in block 504 and determine whether the magnitude of that frequency difference is larger than zero (or another threshold). If so, the temperature circuit 110 continues to tune the oscillator 304 to reduce that frequency difference.

If the magnitude of the frequency difference is zero (or below a threshold), the temperature circuit 110 freezes the oscillator 304 settings or the filter 322 settings in block 510. For example, the temperature circuit 110 may set the filter 322 and the oscillator 304 to maintain the resistance of the resistor 306 or the resistance of a variable resistor component of the resistor 306. As a result, the oscillator 304 may produce the oscillating signal 310 with a steady or fixed frequency. Prior to operating the photonic integrated circuit 102, this frequency should be equal (or within the threshold) of the frequency of the oscillating signal 308. The temperature circuit 110 may disable the filter 322 to end the tuning operating. The temperature circuit 110 may then consider the oscillator 304 tuned, and the photonic integrated circuit 102 may begin operating.

In summary, the system 100 uses a resistor 108 positioned within a photonic integrated circuit 102 to detect a local temperature within the photonic integrated circuit 102. An electronic integrated circuit 104 positioned on the photonic integrated circuit 102 may determine a local temperature around or near the resistor 108 in the photonic integrated circuit 102 based on a resistance of the resistor 108. For example, the resistance of the resistor 108 may change depending on the local temperature in the photonic integrated circuit 102 near the resistor 108. An oscillator 302 in the electronic integrated circuit 104 may produce an oscillating signal 308 with a frequency that changes when the resistance of the resistor 108 changes. The electronic integrated circuit 104 may determine the local temperature near the resistor 108 by monitoring the frequency changes in the oscillating signal 308.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," or "at least one of A or B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function (s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. An electro-optical circuit comprising:
a photonic integrated circuit arranged in a package, the photonic integrated circuit comprising:
an optical component; and
a first resistor positioned by the optical component; and
an electronic integrated circuit arranged in the package, the electronic integrated circuit positioned on the photonic integrated circuit and arranged to determine a temperature for the optical component based on a first resistance of the first resistor.

2. The electro-optical circuit of claim 1, wherein the electronic integrated circuit comprises:
a first oscillator arranged to generate a first signal with a first frequency based on the first resistance of the first resistor; and
a second oscillator arranged to generate a second signal with a second frequency based on a second resistance of a second resistor.

3. The electro-optical circuit of claim 2, wherein the electronic integrated circuit further comprises:
a first frequency divider arranged to produce a third signal with a third frequency based on the first signal; and
a second frequency divider arranged to produce a fourth signal with a fourth frequency based on the second signal.

4. The electro-optical circuit of claim 3, wherein the electronic integrated circuit is further arranged to determine a difference between the third frequency and the fourth frequency, wherein the temperature for the optical component is determined based on the difference between the third frequency and the fourth frequency.

5. The electro-optical circuit of claim 2, wherein the electronic integrated circuit comprises a filter arranged to calibrate the second oscillator.

6. The electro-optical circuit of claim 5, wherein calibrating the second oscillator comprises adjusting a resistance of a variable resistor of the second oscillator.

7. The electro-optical circuit of claim 1, wherein the first resistor comprises doped silicon.

8. The electro-optical circuit of claim 1, wherein the first resistor is electrically connected to the electronic integrated circuit by a via, a metal layer, and a solder bump of the photonic integrated circuit.

9. A method comprising:
determining, by an electronic integrated circuit, a first resistance of a first resistor positioned in a photonic integrated circuit and by an optical component of the photonic integrated circuit, wherein the electronic integrated circuit is positioned on the photonic integrated circuit; and determining, by the electronic integrated circuit, a temperature for the optical component based on the first resistance.

10. The method of claim 9, wherein determining the first resistance comprises:

generating, by a first oscillator in the electronic integrated circuit, a first signal with a first frequency based on the first resistance; and generating, by a second oscillator in the electronic integrated circuit, a second signal with a second frequency based on a second resistance of a second resistor.

11. The method of claim 10, wherein determining the first resistance further comprises:

producing, by a first frequency divider in the electronic integrated circuit, a third signal with a third frequency based on the first signal; and producing, by a second frequency divider in the electronic integrated circuit, a fourth signal with a fourth frequency based on the second signal.

12. The method of claim 11, wherein determining the first resistance further comprises determining a difference between the third frequency and the fourth frequency, and wherein the temperature for the optical component is determined based on the difference between the third frequency and the fourth frequency.

13. The method of claim 10, further comprising calibrating, by a filter in the electronic integrated circuit, the second oscillator.

14. The method of claim 13, wherein calibrating the second oscillator comprises adjusting a resistance of a variable resistor of the second oscillator.

15. The method of claim 9, wherein the first resistor comprises doped silicon.

16. The method of claim 9, wherein the first resistor is electrically connected to the electronic integrated circuit by a via, a metal layer, and a solder bump of the photonic integrated circuit.

17. A system comprising:

a photonic integrated circuit comprising:

an optical component; and a first resistor positioned by the optical component; and an electronic integrated circuit positioned on the photonic integrated circuit, wherein the electronic integrated circuit is arranged to determine a temperature for the optical component based on a first resistance of the first resistor.

18. The system of claim 17, wherein the electronic integrated circuit comprises:

a first oscillator arranged to generate a first signal with a first frequency based on the first resistance of the first resistor; and a second oscillator arranged to generate a second signal with a second frequency based on a second resistance of a second resistor.

19. The system of claim 18, wherein the electronic integrated circuit further comprises:

a first frequency divider arranged to produce a third signal with a third frequency based on the first signal; and a second frequency divider arranged to produce a fourth signal with a fourth frequency based on the second signal.

20. The system of claim 19, wherein the electronic integrated circuit is further arranged to determine a difference between the third frequency and the fourth frequency, wherein the temperature for the optical component is determined based on the difference between the third frequency and the fourth frequency.

* * * * *